United States Patent
Balfanz et al.

(10) Patent No.: US 7,822,863 B2
(45) Date of Patent: Oct. 26, 2010

(54) PERSONAL DOMAIN CONTROLLER

(75) Inventors: Dirk Balfanz, Redwood City, CA (US);
Diana K. Smetters, Belmont, CA (US);
Glenn E. Durfee, San Francisco, CA (US);
Trevor F. Smith, Seattle, WA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 1033 days.

(21) Appl. No.: 11/383,144

(22) Filed: May 12, 2006

(65) Prior Publication Data

US 2007/0266164 A1 Nov. 15, 2007

(51) Int. Cl.
*G06F 15/16* (2006.01)

(52) U.S. Cl. ...................... 709/229; 709/217

(58) Field of Classification Search ................. 709/217, 709/220, 223, 227, 229
See application file for complete search history.

(56) References Cited

U.S. PATENT DOCUMENTS

| | | | |
|---|---|---|---|
| 6,397,261 B1 | 5/2002 | Eldridge et al. | |
| 6,601,102 B2 | 7/2003 | Eldridge et al. | |
| 6,971,017 B2 | 11/2005 | Stringer et al. | |
| 7,424,736 B2* | 9/2008 | Cook et al. | 726/11 |
| 2003/0061511 A1* | 3/2003 | Fischer | 713/201 |
| 2003/0236895 A1 | 12/2003 | Ohkubo et al. | |
| 2005/0213763 A1* | 9/2005 | Owen et al. | 380/270 |
| 2005/0249200 A1 | 11/2005 | Oelsner | |
| 2007/0130457 A1* | 6/2007 | Kamat et al. | 713/151 |

FOREIGN PATENT DOCUMENTS

| | | |
|---|---|---|
| EP | 1 594 317 A1 | 9/2005 |
| JP | 2003 299064 A | 10/2003 |
| WO | WO 03/067594 | 8/2003 |
| WO | WO2005/125091 | * 12/2005 |

OTHER PUBLICATIONS

Abadi, M.; Burrows, M.; Lampson, B.; "A Calculus for Access Control in Distributed Systems," *Lecture Notes in Computer Science No. 576*, Springer, 1992, (29 pages).

Balfanz, D.; Dean, D.; Spreitzer, M.; "A Security Infrastructure for Distributed Java Applications," *21th IEEE Computer Society Symposium on Research in Security and Privacy*, Oakland, CA, May 2000 (12 pages).

(Continued)

*Primary Examiner*—Ramy M Osman
*Assistant Examiner*—Marshall McLeod
(74) *Attorney, Agent, or Firm*—Marger Johnson & McCollom, P.C.

(57) ABSTRACT

A method of accessing a data resource identifies the data resource, the data resource accessible through a first device and associated with a resource locator, the first device configured to provide access to the data resource responsive to possession of a whitelisted credential. The method includes receiving a second-device credential from a second device by a personal domain controller, the personal domain controller and the first device within a first trusted relationship and provides, by the personal domain controller, the second-device credential to the first device for whitelisting subject to the first trusted relationship. The method uses, by the second device, the second-device credential to access the data resource responsive to the resource locator.

17 Claims, 6 Drawing Sheets

OTHER PUBLICATIONS

Balfanz, D.; Durfee, G.; Grinter, R.; Smetters, D.K.; Stewart, P.; "Network-in-a-Box: How to Set Up a Secure Wireless Network in Under a Minute," *Proceedings of the 13th USENIX Security Symposium*, San Diego, CA, Aug. 2004.

Balfanz, D.; Smetters, D. K.; Stewart, P.; Wong, H. Chi; "Talking to Strangers: Authentication in Ad-Hoc Wireless Networks," *Proceedings of the 2002 Network and Distributed Systems Security Symposium (NDSS '02)*, San Diego, CA, Feb. 2002. The Internet Society (13 pages).

Bauer, L.; Schneider, M.A.; Felten, E.W.; "A General and Flexible Access-Control System for the Web," *Proceedings of the 11th USENIX Security Symposium*, San Francisco, CA, Aug. 2002. (16 pages).

Blaze, M.; Feigenbaum, J.; Ioannidis, J.; and Keromytis, A.; "The KeyNote Trust-Management System Version 2," *IETF—Network Working Group*, The Internet Society, Sep. 1999. RFC 2704 (35 pages).

Corner, M. D.; Noble, B. D.; "Zero-Interaction Authentication," *Proceedings of the Eighth Annual International Conference on Mobile Computing and Networking (MOBICOM-02)*, New York, Sep. 23-28 2002, ACM Press (11 pages).

Lorrie Faith Cranor and Simpson Garfinkel, editors, "Security and Usability—Designing Secure Systems the People Can Use," chapter 16, O'Reilly Media, Inc., 2005.

DeTreville, J.; "Binder, a Logic-Based Security Language," *2002 IEEE Symposium on Security and Privacy*, Oakland, CA, May 2002 (9 pages).

GoToMyPC, http://www.gotomypc.com (1 page).

Halpern, J.Y.; van der Meyden, R.; "A Logic for SDSI's Linked Local Name Spaces" (Preliminary Version), *Proceedings of the 12th IEEE Computer Security Foundations Workshop*, Mordano, Italy, Jun. 1999, (12 pages).

Orb Networks, http://www.orb.com (1 page).

Oprea, A.; Balfanz, D.; Durfee, G.; Smetters, D.K.; "Securing a Remote Terminal Application with a Mobile Trusted Device," *Proceedings of the Annual Computer Security Applications Conference*, Tucson, AZ, Dec. 2004 (10 pages).

Smetters, D.K.; Grinter, R. E.; "Moving From the Design of Usable Security Technologies to the Design of Useful Secure Applications," *New Security Paradigms Workshop '02*, ACM 2002 (8 pages).

Stajano, F.; Anderson, R.; "The Resurrecting Duckling: Security Issues for Ad-hoc Wireless Networks," *7th Security Protocols Workshop*, vol. 1796 of *Lecture Notes in Computer Science*, Cambridge, United Kingdom, 1999, Springer-Verlag, Berlin Germany (11 pages).

DVB-Digital Video Broadcasting: "Digital Video Broadcasting (DVB); Content Protection & Copy Management," DVB Document A094, Nov. 2005, (103 pages).

\* cited by examiner

PERSONAL DOMAIN CONTROLLER

GOVERNMENT FUNDING

This invention was made with Government support under Contract No. 70NANB3H3052 issued by the National Institute of Standards and Technology. The Government has certain rights in this invention.

BACKGROUND

When remotely accessing sensitive sources from an untrusted terminal, such as a kiosk, a PC at a client site, or a computer in a hotel room, a user generally has two choices. First, the user can give the untrusted device full access to the domain containing the sensitive resources. For example, a user name and password, typed in from a kiosk PC, gives that untrusted PC full access to the user's home network, either at the user's house or workplace.

Second, the user creates some sort of restricted role by specifying ahead of time to which of the sensitive resources the restricted role will have access. For example, a user has a 'traveling' or guest username and password that allows a user to see only those things that were previously determined would be accessible by that username and password. A shortcoming of this approach is that the user may need more dynamic access to the sensitive resources or may incorrectly guess at which resource he or she will need when operating remotely.

This situation puts the user in between unsecure operations, allowing an unknown, untrusted terminal access to sensitive resources, and inconvenience, having to correctly guess to what access will be needed or going without that access.

SUMMARY

DETAILED DESCRIPTION

Figure 1:
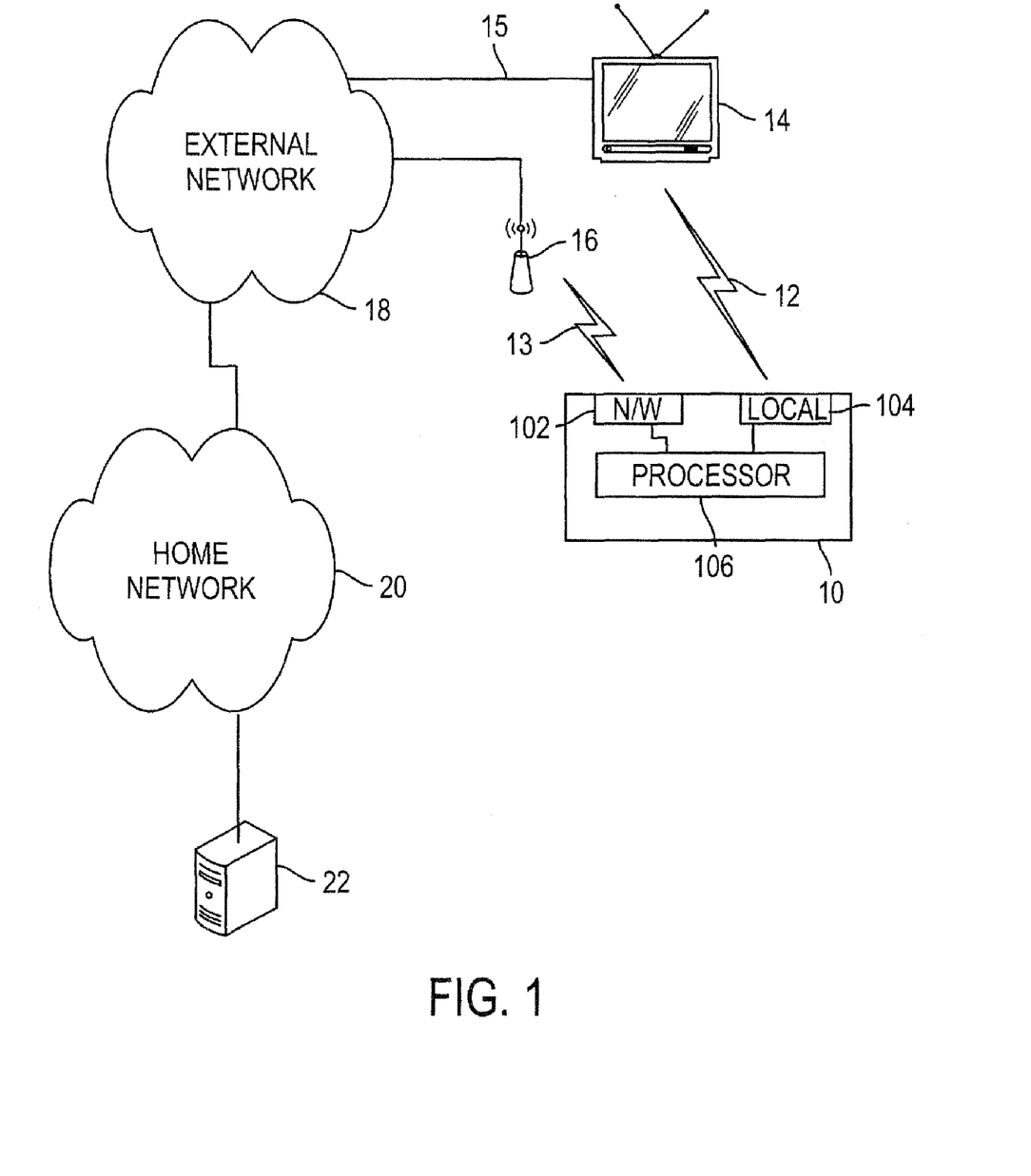
FIG. 1 shows an embodiment of a network at a remote site in communication with a network at a home site.

FIG. 1 shows an example of a network established at a remote site, such as a hotel room. The remote network has a TV 14 and a client 10. The client 10 is some device that the user carriers with him or her, such as a cell phone, personal digital assistant (PDA) or other portable electronic device. The device 10 has a local port 104 that allows it to communicate with an untrusted terminal, such as the TV. The local link may be infrared or ultra high frequency (UHF), as is commonly found in remote controls, BlueTooth®, an audio communication link such as a tone system, a visible light link, a wireless link in accordance with the Institute of Electrical and Electronic Engineers (IEEE) 802.11 standards, etc. It must be noted that any link that does not involve a direct, wired connection is wireless, but the term 'wireless' is often used interchangeably with 'wireless fidelity' or Wi-Fi, associated with the 802.11 standards.

The device 10 also has a network port 102. The network port 102 may be a wireless port that allows the device to access an external network 18 through connection 13, the external network being a network such as a wide area network, through which it can access the home network 20, or a local area network that is connected to a larger network, such as a WAN. Alternatively, the network port may be a 'wired' network port, such as an Ethernet port that connects via a cable to a network.

The client 10 is a credentialed member of the home network 20. A credentialed member refers to a member of the home network that has received a security credential from the same credential-granting authority as the other devices in the home network. 'Home' network is not meant to imply only a network at a user's home, but a trusted network in which the user normally operates and the client normally resides. A network at the user's home is an example of such a network as is a network at the user's business office.

One skilled in the art will understand that not all of the displayed features of the networked system or the device 10 need to be present for all embodiments of the invention. Such a skilled person will understand that the device 10 can be a network appliance or device and need not include a general purpose computer. The device may be referred to as a computer, in that it has a processor 106.

Further, one skilled in the art will understand that a procedure or process may be a self-consistent sequence of computerized processes that lead to a desired result. These processes can be defined by one or more computer instructions. These processes may be stored all or in part on an article of computer readable media containing the instructions. The instructions when executed cause the computer, here the device 10, to perform the processes set out herein.

One skilled in the art will understand that the examples and embodiments discussed here are for better understanding and are in no way intended to, nor should they be interpreted to, limit the scope of the claims to any example given.

In an example of operation of the network, the TV 14 is in a hotel room. The TV has an infrared port for reception of infrared signals on an infrared communications link 12 from a remote control, similar to most currently available TVs. The TV also has a network connection to an external network 18 like the Internet. The network connection may be a wireless connection, through a wireless access point 16 in accordance with 802.11, or an Ethernet or other wired connection 15. Many other types of untrusted terminals exist and may include kiosks, personal computers, music players, video game consoles, etc.

The client personal domain controller (PDC) 10 has received credentials from the credential granting authority of the home network 20. For example, when the user was at home, the PDC 10 was provided with a credential to make the PDC 10 a trusted member of the home network.

In FIG. 1, the user would activate the PDC or an application on the PDC to present a GUI that looks like a remote control. The PDC device would connect with the TV 12 through the infrared port, exchanging credentials. The PDC would send its personal domain controller credential, and the TV or other device would send its device credential. Credentials may include public keys, public-key certificates, cryptographic hashes of public keys, and cryptographic hashes of public-key certificates. The PDC would also connect through the hotel network 13 to an external network 18 back to the home network 20, probably through a secure tunnel or VPN.

The client/PDC GUI shows an indicator or indicators of the data resources available on the home network, such as video files on the home media server 22, in addition to data resources that may be available on the local network 18, such as television channels offered by the hotel. An example of the home video server may be a digital video recorder. When the user selects one of the shown resources on the PDC 10 for playback on the TV 14, the PDC provides information about the selected video to the server 22. As part of this information, the PDC will provide the credential of the TV, received from the infrared communications between the TV and the PDC. The server will 'whitelist' the credential for access to the desired video for one-time access, where 'whitelisting' as used here means to add the credential to an authorized access list for the entity, in this case the server.

With the information provided from the PDC, the server will initiate a session between itself and the TV. The server sends a resource locator, such as a Uniform Resource Locator (URL) or other suitable information, associated with the resource where the video will be available to the PDC. The server will also alter or configure the firewall of the home network to allow the identified TV access. The configuration may take the form of permissions for properly authenticated traffic to reach the source, where the authentication is the credential of the sink. The server is configured to provide access to the resource responsive to possession of the whitelisted credential.

The PDC then provides the URL and the credential of the server to the TV. The server and the TV now have the necessary information to establish a one-time access session. The server knows the credential of the TV that is supposed to access the video and the TV knows the credential of the server and the location of the video. The TV can now contact the server and request the content and the server can safely send it.

Figure 2:
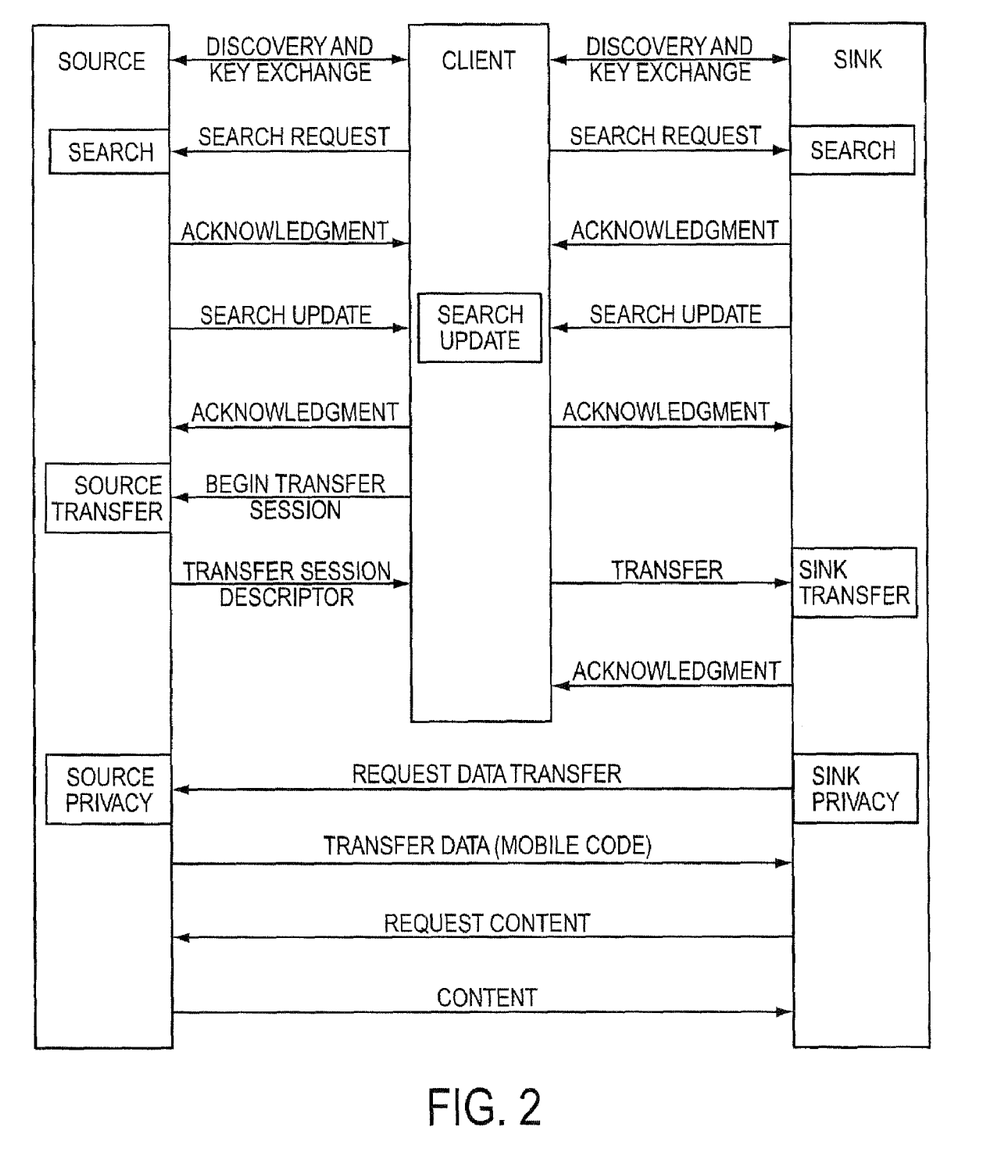
FIG. 2 shows an embodiment of a message flow diagram between a client, a server and an untrusted terminal.

Looking now at the message flow diagram of FIG. 2, it is possible to see the 'hidden' messages and exchanges between the three devices. These are 'hidden' in that the user does not see the exchanges, making his experience seamless in accessing the video he wants to watch from his home media server at the TV in his hotel room. The interactions may take place between many different types of devices. They will be more broadly referred to as the source, of which the media server is an example, the sink, of which the TV is an example, and the client, of which the PDC is an example.

In the message flow diagram, the source, client and sink discover each other and exchange credentials. This is done 'in the clear' or across a VPN or secure tunnel. The client then transmits a search request to the source and the sink. This search request is controlled to protect both the source and sink, also referred to as host components, from unwanted searches. The situations in which the system asserts control to protect/secure the messages will be referred to as access control points. These are points in the process of making connections and providing access where the authorization is confirmed and re-confirmed to ensure security of sensitive resources.

This particular situation, in which the source and sink are protected from unwanted searches, will be referred to here as the search access control point. This is shown in FIG. 2 as the box labeled 'Search' at both the source and the sink.

In the situation where the search request is sent over the Secure Sockets Layer (SSL), as in the above system, the component hosts learn the credential of the client during the SSL handshake that is part of the "discovery and key exchange" process, where the term 'key' represents any security credential. The component hosts then verify that the credential of the client satisfies certain constraints. Specific to the example above, at the search access control point the TV verifies that the credential of the client is the same as the credential of the PDC it exchanged over infrared earlier, and the source in the home network verifies that the client's credential is certified by the home network. If that were not true, the search access control points would prevent the searches from occurring.

Figure 3:
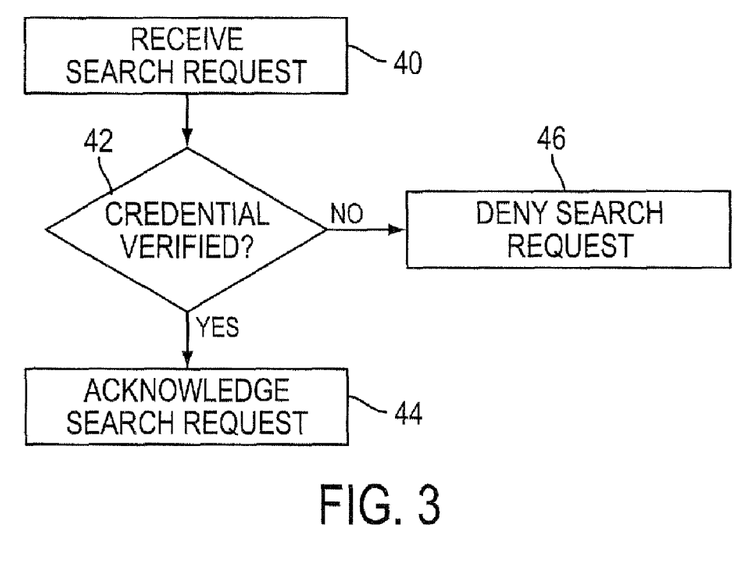
FIG. 3 shows an embodiment of a method to provide a search access control point.

FIG. 3 describes the search access control point. The search request is received at either the source or the sink at 40. The credential of the client is verified at 42. At the source, the credential may be verified to be the certificate issued at the home network to the PDC. At the sink, the credential may be verified to be the credential exchanged over the IR link. If the credential verifies, the search request is acknowledged at 44. If the credential does not verify, the request is denied at 46. If the process progresses past the search access control point, the host components would send acknowledgement messages back to the client acknowledging the search request.

Returning to FIG. 2, upon completing the searches, the host components send updated search results to the client, informing it about found components matching the client's search criteria. The search update access control point allows the client to decline some search updates, 'hiding' or masking risky or unverified components from the user.

Figure 4:
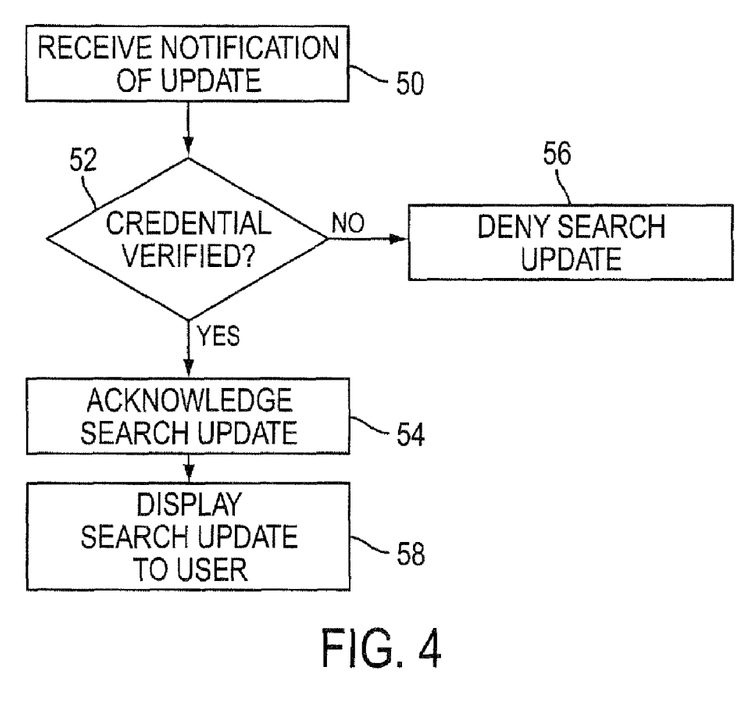
FIG. 4 shows an embodiment of a method to provide a search update access control point.

The decision to accept or decline the update will more than likely rest upon the certificate of the host component, as shown in FIG. 4. The client may receive search update notification messages indicating that a new component has been found and is available for connections at 50. Whether those messages will actually result in the information being presented to the user will be determined by decision made at the search update access control point. At 52, the credentials of the source or sink hosts will be verified. If the credential verifies at 52, the search update is acknowledged at 54. At 58, the search update results are displayed to the user. If the credential does not verify, the search update is denied at 56.

At this time, the user will select a resource on the home network, such as a video file, for display on the sink (hotel TV). As shown in FIG. 2, this causes the client to send a message as a signal to initiate a transfer session to the source host on the home network, the source. This initiation involves the source transfer access control point shown in FIG. 5. The signal to initiate the transfer session is received at 60. Based upon the certificate of the client, descriptions of both of the intended sink and the desired source components, and the certificate of the sink host at 62, the source host may decline or deny a transfer session at 66. If the certificates and the descriptions all verify, a transfer session descriptor is transmitted to the client at 64. At the same time, a reference monitor on the source whitelists the sink certificate for in-session access to the identified source component at 65.

Figure 5:
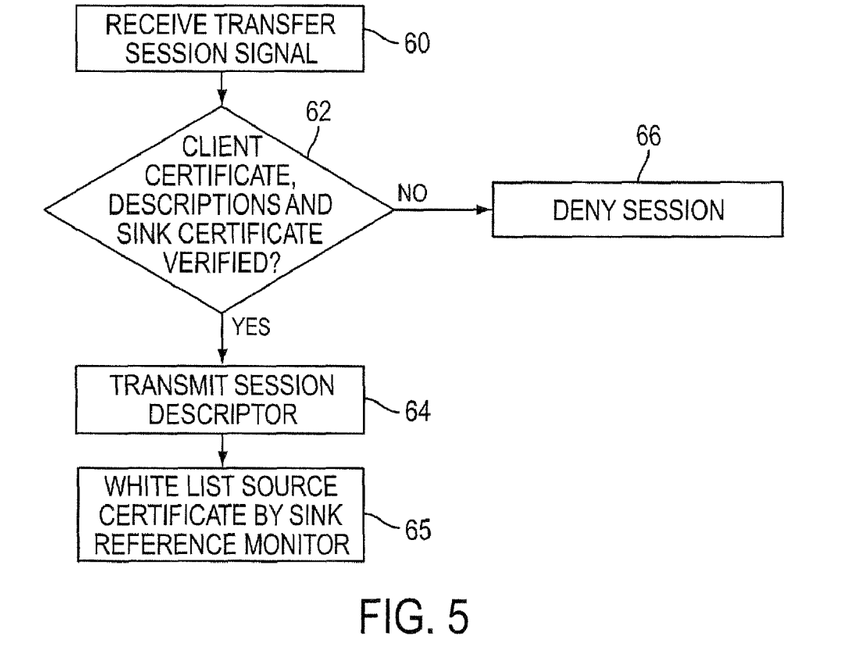
FIG. 5 shows an embodiment of a method to provide a source transfer access control point.

In one embodiment, a reference monitor is an object residing on a device, such as the client, that is called into by the access control point procedures being executed on that device. In this manner, all of the different checks originating at the access control points end up being processed by the same object. The reference monitor may be invoked every time an outside party accesses, or references, a sensitive resource. In some instances, the source code for the reference monitor may be in a file having all of the security checks grouped within it.

Figure 6:
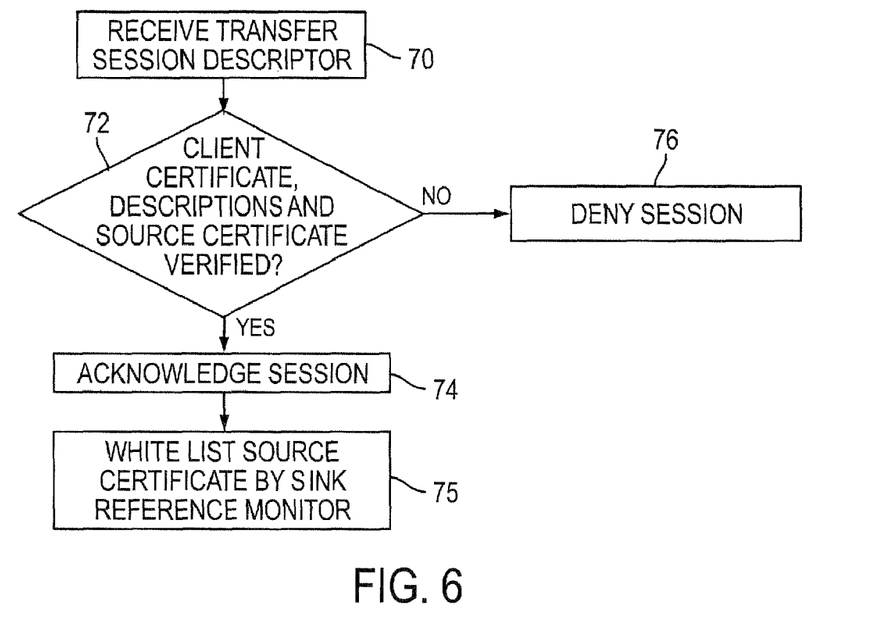
FIG. 6 shows an embodiment of a method to provide a sink transfer access control point.

Returning to the message flow diagram of FIG. 2, the client passes the transfer session descriptor received from the source host to the sink host. The reception of the transfer session descriptor at the sink is checked by another access control point, the sink transfer control point shown in FIG. 6. The transfer session descriptor is received at the sink at 70. Based upon the certificate of the client, a description of both the intended source and sink components, and the certificate of the source at 72, the sink may decline to accept or deny a transfer session at 76. When the sink transfer control point is successfully passed, the sink transmits an acknowledgement to the client at 74, also shown in FIG. 2. At the same time, a reference monitor on the sink whitelists the source certificate for in-session access at 75.

Figure 7:
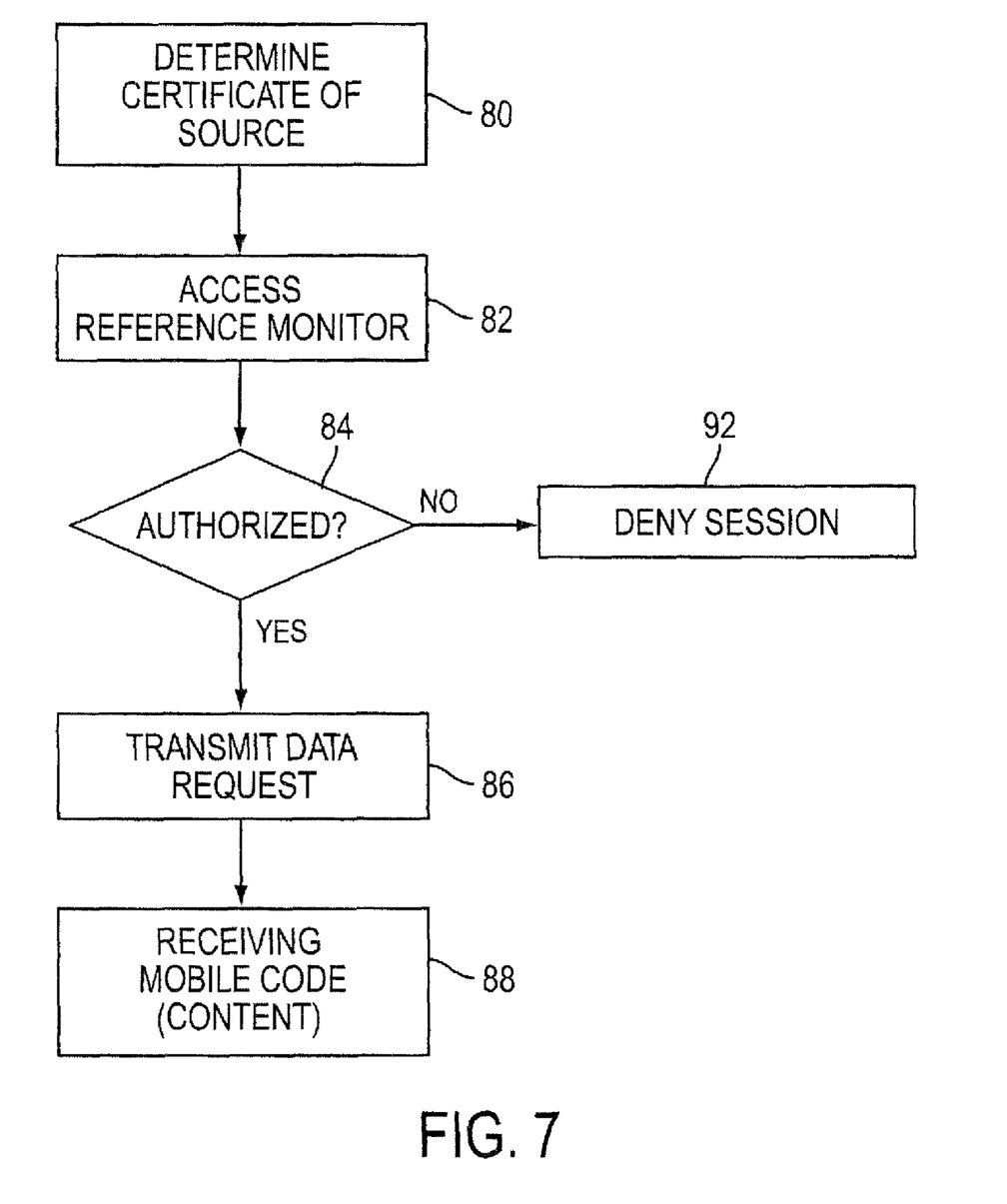
FIG. 7 shows an embodiment of a method to provide a sink privacy access control point.

The sink then sends a request for the session's transfer data to the source. In order to protect the privacy of the sink, a sink privacy access control point ensures that the request for data is only sent to legitimate sources. The response to the request for data is mobile code that allows a source to access the sink, so sink may decline to send this request to and receive mobile code from certain sources. This process is shown in FIG. 7.

This may be implemented by an SSL handshake, during which the sink learns the certificate of the source at 80. The reference monitor is then accessed at 82 to determine if the certificate of the source is on the intended session's whitelist at 84. If it is, the sink will transmit the data transfer request at 86. If it is not, the request will be denied at 92. Assuming the source privacy access control point is successfully passed, discussed below, the sink would receive the mobile code at 88.

Figure 8:
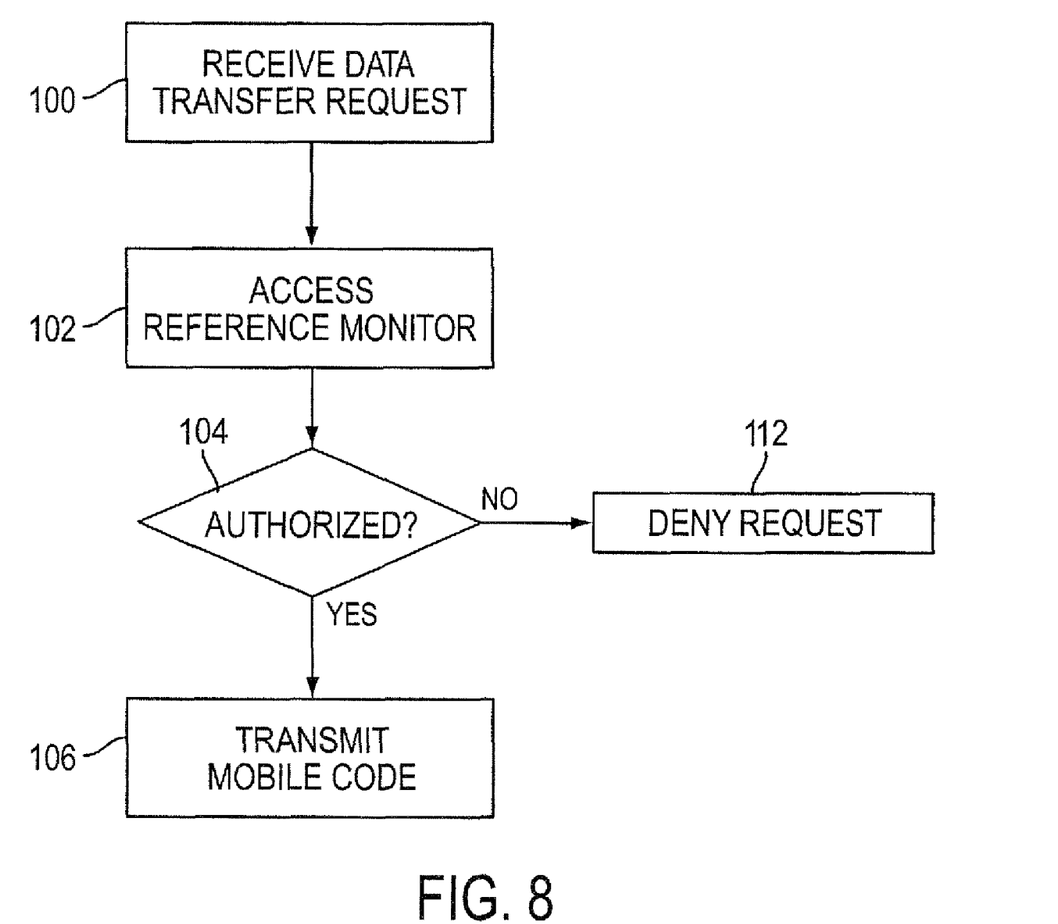
FIG. 8 shows an embodiment of a method to provide a source privacy access control point.

On the other side of the messaging, the source may decline to send any content to an unauthorized sink. The source privacy access control point shown in FIG. 8 will work in a similar fashion to the sink privacy access control point, except that the certificate of the source will be verified by the reference monitor, which is discussed in more detail below.

The data transfer request is received at 100. The reference monitor is accessed at 102 to verify that the sink credential is on the whitelist at 104. If the sink is authorized, the mobile code is transmitted at 106. If the sink is not authorized, the transfer request is denied at 112. When the sink has received the mobile code, the execution of the mobile code on the sink will cause a content request message to be sent from the sink to the source. The sink executes again the steps in FIG. 7, except that this time actual content (e.g. a movie) is transmitted in step 88. Likewise, the source will execute the steps in FIG. 8 again, except that in step 106 the source now transmit actual content.

Returning to the example of the user in his hotel room trying to play the video on the hotel TV, it is possible to see how the various access controls can be successfully passed when the correct certificates are presented in the initial parts of the transaction. As previously discussed, the initial infrared exchange between the client/PDC (cell phone or PDA) and the sink (hotel TV) results in the client having the certificate for the TV, and the exchange between the client and the media server results in the source identifying the client as a trusted member of the home network.

When the user sees the list of videos on the client, the user presses a button on the client to select the desired video. This causes the begin transfer message to be sent to the source, which includes the credential of the TV to be whitelisted for one-time access by the reference monitor and for which the firewall is to be configured. The transfer session descriptor is sent to the client as a trusted member of the home network and the client passes that information on to the TV. The TV recognizes the client's certificate from the initial infrared interaction and accepts the transfer session descriptor.

The TV then connects to the server with the request for the video, which responds with the necessary code to allow the TV to render the content. The TV is allowed access to the server through the firewall, as its credential matches the credential for which the firewall was configured. The server then transmits the content to the TV, which is identified by its credential.

This infrastructure of the system allows developers to implement different policies by supplying different implementations of the reference monitor. In some instances, the reference monitor is a Java object that has the various methods for the access control points mentioned above. The developers will only have to implement policies for the search access, search update, source transfer session and sink transfer session control points. The sink and source privacy control points are implemented in middleware.

The middleware will place authorized certificates on the whitelist for a particular transfer session. The certificate may be indexed by the transfer session descriptor, as an example. Whatever decision is made at the source transfer session control point determines whether the sink credential is whitelisted. Similarly, whatever decision is made at the sink transfer session control point determines if the source credential is whitelisted.

This results in a session-based access control. The untrusted component (the hotel TV) is allowed a one-time access to a very specific resource (the video), without having to allow it access to the entire network.

Another aspect of the session-based access control is the case of certificate revocation. Returning to FIG. 2, if the user presses STOP or PAUSE on the remote control GUI on the client during the content transfer, the session is terminated. The certificate for the sink is automatically revoked and removed from the whitelist. This prevents any further communication between the source and the sink.

The session may end for reasons other than a user pressing a button on a remote control. All of the data associated with that particular resource may have been transmitted to the sink, the connection was lost, an error condition arose, etc.

In the instance of the user pressing the PLAY or 'unpausing' the video, the source, sink and client repeat their authentication process, transparent to the user. An additional feature of the system may be the storage on the PDC of the 'stop' or 'pause' point in the data content stream. The user may access a video from home, for example, that was paused when viewing it last. The system may then allow the user to continue to watch the video from that point by retrieving the pause point as an index into the data stream. The system would then cue the resource responsive to that index.

Another aspect of this system is that the policy that determines if the access is granted or not is made 'on the fly' in that no previous policies need to be in place. The user does not have to sit and home and try to figure out all of the scenarios in which he or she may want to access resources on the home network.

In addition, communications are traceable to a particular session with a particular sink or source. If the communicate is not traceable to a particular authorized session, the communication is declined.

One of the aspects of the session-based control is the ability to implement policies. While the user does not have to specify any previously existing policies to allow the hotel TV to access the home network, it is assumed that many devices that the user encounters or configures into the home network have pre-existing policies. The session-based control allows these 'hard-coded' or 'meta' policies to be easily implemented by skilled software programmers.

In the example of the home media server providing a video to the hotel TV, a set of meta-policies are assumed to exist. For the search access control point, it is assumed that the media server would only allow searches by those devices having credentials from the home domain, the PDC has no allowed searches, and the TV only allows searches by devices that have sent credentials via the IR communications at start up.

At the search update access control point, the client is assumed to allow search updates to be sent from the home domain devices, such as the home server. Other than that, the client will only allow search updates to be received from a previously received credentialed device, such as the TV. The TV is assumed to not allow any search updates.

The home device is assumed to allow a session with any sink, as long as the client initiating the transfer session is from the home domain at the source transfer session access control point. The client will only allow sessions where the client is the PDC itself and the sink is the IR-authenticated device. The TV will only allow sessions with the TV as the source if the TV is also the sink.

At the sink transfer session access control point, a home device will allow any session with any sink as long as the client initiating the session is from the home domain. The client does not allow any sessions with the PDC in a sink role. The TV will allow sessions with any source as long as the client is the IR-authenticated device, such as the client being the remote control that switched on the TV. For the source and sink privacy access control points, the policies are automatically handled by the middle ware.

While particular embodiments have been described, alternatives, modifications, variations, improvements, and substantial equivalents that are or may be presently unforeseen may arise to applicants and other skilled in the art. Accordingly, the claims as set out below are intended to embrace all such alternatives, modifications, variations, improvements, and substantial equivalents.

The invention claimed is:

1. A method of accessing a data resource comprising:
   establishing a trusted relationship between a personal domain controller and a first device;
   identifying the data resource using a personal domain controller, the data resource accessible through a first device and associated with a resource locator;
   receiving a second-device credential from a second device at a personal domain controller over a local link;
   sending, by the personal domain controller over the local link, a personal domain controller credential to the second device to establish a second trusted relationship;
   providing the second-device credential to the first device from the personal domain controller, the second device credential to be added to a whitelist by the first device;
   sending a first-device credential to the second device for whitelisting subject to the second trusted relationship;
   verifying that the first-device credential is whitelisted by the second device;
   providing a resource locator to the second device by the personal domain controller;
   connecting by the second device, to the first device to access the data resource, the first device allowing the connection based upon the whitelist; and
   receiving the data resource by the second device responsive to the verifying.

2. The method of claim 1, wherein the local link is selected from a group consisting of: an infrared link, a visible light link, a BlueTooth link, a wireless link in accordance with IEEE 802.11 standards, a wired link, an audio communication link, and an ultra-high frequency radio link.

3. The method of claim 1, wherein the second device and the first device connect over a network.

4. The method of claim 3, further comprising establishing at least one selected from a group consisting of a virtual private network and a secure tunnel.

5. The method of claim 1, wherein identifying the data resource further comprises:
   activating a user interface on the personal domain controller;
   presenting a representation of the data resource on the user interface; and
   receiving a user input to select the representation of the data resource.

6. The method of claim 1, wherein the second-device credential is selected from a group consisting of public keys, public-key certificates, cryptographic hashes of public keys, and cryptographic hashes of public-key certificates.

7. The method of claim 1, further comprising:
   terminating connection between the first device and the second device; and
   removing the second-device credential from the whitelist of the first device responsive to the termination.

8. The method of claim 1, further comprising:
   storing an index into the data resource; and
   cueing the data resource responsive to the index.

9. An article of computer-readable media containing instructions that when executed by a computer cause the computer to:
   establish a trusted relationship between a personal domain controller and a first device;
   identify a data resource, the data resource accessible through a first device and associated with a resource locator;
   receive a second-device credential from a second device over a local link;
   send a personal domain controller credential to the second device to establish a second trusted relationship;
   provide the second-device credential to the first device, the first device to whitelist the second-device credential to allow the second device access through the first device;
   sending a first-device credential to the second device for whitelisting subject to the second trusted relationship;
   verifying that the first-device credential is whitelisted by the second device;
   providing a resource locator to the second device to allow the second device to connect to the first device.

10. The article of claim 9, the instructions further to cause the computer to establish at least one selected from a group consisting of a virtual private network and a secure tunnel.

11. The article of claim 9, the instructions to cause the computer to identify the data resource further causing the computer to:
   activate a user interface on the personal domain controller;
   present a representation of the data resource on the user interface; and
   receive a user input to select the representation of the data resource.

12. The article of claim 9, the instructions further to cause the computer to:
   terminate communications between the first device and the second device; and
   remove the second-device credential from the whitelist of the first device responsive to the termination.

13. The article of claim 9, the instructions further to cause the computer to:

store an index into the data resource; and cue the data resource responsive to the index.

14. A personal domain device, comprising:

a first user interface to allow a user to communicate with a first device and to select a data resource available through the first device;

a first port to allow access to the data resource through the first device, the data resource associated with a resource locator, the port further to allow the first device and the personal domain device to establish a trusted relationship;

a second user interface to allow a user to communicate with a second device;

a second port to allow communication with the second device including reception of a second-device credential from the second device, transmission of a personal domain controller credential to allow establishing of a second trusted relationship, and transmission of a first device credential to the second device for whitelisting; and a processor to:

verify that the first-device credential is whitelisted by the second device;

provide the second-device credential to the first device for whitelisting subject to the trusted relationship;

provide a resource locator to the second device to allow the second device to connect to the first device.

15. The device of claim 14, wherein the personal domain device further comprises one selected from the group consisting of: a cellular phone, a personal digital assistant, and a portable electronic device.

16. The device of claim 14, wherein the first port further comprises one selected from the group consisting of: a wireless network radio, a wired network connection, and an Ethernet port.

17. The device of claim 14, wherein the second port further comprises one selected from the group consisting of: an infrared port, an audio port, a visible light port, a BlueTooth port, a radio in accordance with IEEE 802.11 standards, a wired port, an audio communication link, and an ultra-high frequency radio.

* * * * *

UNITED STATES PATENT AND TRADEMARK OFFICE
CERTIFICATE OF CORRECTION

| | | |
|---|---|---|
| PATENT NO. | : 7,822,863 B2 | Page 1 of 1 |
| APPLICATION NO. | : 11/383144 | |
| DATED | : October 26, 2010 | |
| INVENTOR(S) | : Dirk Balfanz et al. | |

It is certified that error appears in the above-identified patent and that said Letters Patent is hereby corrected as shown below:

On the Cover Page, item (73) the Assignee reads as "Palo Alto Research Center Incorporated, Palo Alto, Ca (US)", it should read --Palo Alto Research Center Incorporated, Palo Alto, CA (US) and Samsung Electronics Co., Ltd., Democratic Republic of Korea--

Signed and Sealed this
Twenty-sixth Day of April, 2011

David J. Kappos
*Director of the United States Patent and Trademark Office*